(12) United States Patent
Tye et al.

(10) Patent No.: US 8,531,828 B2
(45) Date of Patent: Sep. 10, 2013

(54) STORAGE DEVICE CARRIER HAVING A PIVOTING PANEL

(75) Inventors: Trentent Tye, Calgary (CA); Mark C. Solomon, San Jose, CA (US); Troy G. Tye, Calgary (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 370 days.

(21) Appl. No.: 12/996,384

(22) PCT Filed: Jun. 4, 2008

(86) PCT No.: PCT/US2008/065716
§ 371 (c)(1),
(2), (4) Date: Dec. 3, 2010

(87) PCT Pub. No.: WO2009/148443
PCT Pub. Date: Dec. 10, 2009

(65) Prior Publication Data
US 2011/0096493 A1 Apr. 28, 2011

(51) Int. Cl.
*G06F 1/16* (2006.01)

(52) U.S. Cl.
USPC .................................................. 361/679.33

(58) Field of Classification Search
USPC .................................................. 361/679.33
See application file for complete search history.

(56) References Cited

U.S. PATENT DOCUMENTS

| | | | | |
|---|---|---|---|---|
| 5,777,845 A * | 7/1998 | Krum et al. | ............. | 361/679.34 |
| 6,052,278 A * | 4/2000 | Tanzer et al. | ............ | 361/679.33 |
| 6,142,796 A | 11/2000 | Behl et al. | | |
| 6,337,793 B1 * | 1/2002 | Vier et al. | ................ | 361/679.57 |
| 6,407,913 B1 | 6/2002 | Peachey et al. | | |
| 6,639,792 B1 | 10/2003 | Chang | | |
| 6,798,650 B2 | 9/2004 | Reznikov et al. | | |
| 6,885,551 B2 * | 4/2005 | Chen | ......................... | 361/679.33 |
| 7,016,190 B1 * | 3/2006 | Chang | ...................... | 361/679.33 |
| 7,203,061 B1 | 4/2007 | Chen | | |
| 7,379,294 B2 * | 5/2008 | Chen | ........................ | 361/679.33 |
| 7,492,586 B2 * | 2/2009 | Peng et al. | ............... | 361/679.33 |
| 7,609,511 B2 * | 10/2009 | Peng et al. | ............... | 361/679.37 |
| 7,684,181 B2 * | 3/2010 | Peng et al. | ............... | 361/679.33 |
| 7,684,182 B2 * | 3/2010 | Zhang et al. | ............. | 361/679.33 |
| 7,697,278 B2 * | 4/2010 | Peng et al. | ............... | 361/679.35 |
| 7,701,703 B2 * | 4/2010 | Peng et al. | ............... | 361/679.33 |
| 7,701,707 B2 * | 4/2010 | Peng et al. | ............... | 361/679.37 |
| 7,729,110 B2 * | 6/2010 | Zhang et al. | ............. | 361/679.33 |
| 7,903,401 B2 * | 3/2011 | Lee et al. | .................. | 361/679.33 |
| 8,254,106 B2 * | 8/2012 | Lin et al. | ................... | 361/679.33 |
| 2003/0011981 A1 | 1/2003 | Curtis et al. | | |
| 2006/0087808 A1 | 4/2006 | Yang | | |
| 2006/0146441 A1 | 7/2006 | Chih | | |
| 2012/0250243 A1 * | 10/2012 | Harris | ...................... | 361/679.33 |

FOREIGN PATENT DOCUMENTS

DE 10007418 A1 9/2001
EP 0763792 A1 3/1997

OTHER PUBLICATIONS

WIPO, PCT/US2008/065716, International Search Report, Feb. 20, 2009.

* cited by examiner

*Primary Examiner* — Lisa Lea Edmonds

(57) ABSTRACT

An apparatus includes a storage device having at least one electrical connector and at least one first engagement structure separate from the at least one electrical connector. A carrier receives the storage device, where the carrier has at least one pivotable panel that is pivotable between a closed position and an open position. The panel has at least one second engagement structure to mechanically engage with the at least one first engagement structure if the panel is in the closed position, and the at least one second engagement structure is released from the at least one first engagement structure if the panel is in the open position.

11 Claims, 3 Drawing Sheets

STORAGE DEVICE CARRIER HAVING A PIVOTING PANEL

BACKGROUND

Certain storage devices, such as hard disk drives, are contained in carriers. A carrier provides protection for a hard disk drive that is mounted inside the carrier. Also, the carrier has external mounting mechanisms to enable the carrier to be easily mounted into a larger assembly, such as to a rack of hard disk drives or a computer system.

Under certain conditions (e.g., to perform repair, replacement, or for other maintenance purposes), it is desirable to have access to a hard disk drive that is mounted inside the carrier. Often, the engagement mechanisms used for mounting a hard disk drive inside a carrier prevent easy removal or insertion of the hard disk drive. Specific instructions provided by a manufacturer are often relied upon by service technicians or other users to remove or insert a hard disk drive from or into a carrier. In many cases, a tool (e.g., screwdriver, etc.) may have to be used to remove or insert a hard disk drive in the carrier.

Because of the above difficulties, a user may spend a relatively large amount of time trying to remove and insert a hard disk drive in a carrier. If a user (such as a service technician) has to work on a large number of hard disk drive assemblies, then the inefficiencies associated with removing hard disk drives or inserting hard disk drives from or into respective carriers are magnified many times over.

BRIEF DESCRIPTION OF THE DRAWINGS

Some embodiments of the invention are described, by way of example, with respect to the following figures.

DETAILED DESCRIPTION

Figure 1A:
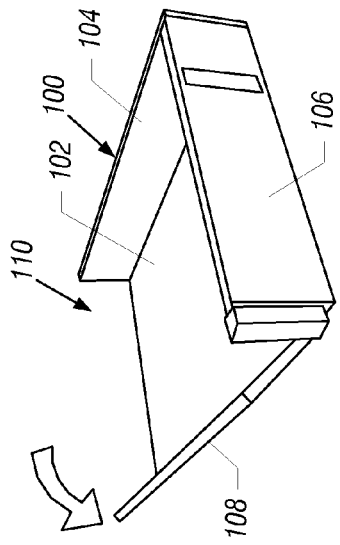
FIGS. 1A-1C illustrate a carrier according to an embodiment that has a pivotable side panel.

In accordance with some embodiments, to enable convenient removal and insertion of a storage device, a carrier for the storage device has at least one pivotable side panel that is pivotable between a closed position and an open position. The carrier defines a chamber to receive the storage device. In some embodiments, the storage device is a disk-based storage device, such as a hard disk drive, an optical disk drive, and so forth. In other embodiments, the carrier can be used to carry other types of storage devices.

To lockingly engage the storage device inside the carrier, the storage device has at least one first engagement structure, and the pivotable side panel of the carrier has at least one second engagement structure that is mechanically engageable with the at least one first engagement structure when the side panel is pivoted to the closed position. However, if the side panel is pivoted to the open position, the first and second engagement structures are released from each other. Once the engagement structures are released, a user (such as a service technician) can easily remove the storage device from the chamber of the carrier. The pivotable side panel can be easily manipulated by a user to pivot between the closed and open positions. When the side panel is pivoted to the open position, the storage device can be removed from the carrier. Also, after a user inserts a storage device in the carrier, the user can easily pivot the side panel to the closed position such that the first and second engagement structures are engaged, and the storage device is locked inside the carrier.

The first and second engagement structures of the storage device and carrier are mechanical engagement structures that are configured without any electrical connection elements. In other words, the first and second engagement structures allow the storage device and carrier to be mechanically attached to each other without having to make an electrical connection through the first and second engagement structures. The omission of electrical connection elements from the first and second engagement structures allows for a simpler and more cost effective design of the engagement structures.

In some embodiments, the first engagement structure of the storage device can be a receptacle, such as a screw hole or other opening. Note that many standard storage devices, such as disk-based storage devices, are manufactured with pre-formed screw holes to enable such disk-based storage devices to be mounted in carriers with screws. However, in accordance with some embodiments, instead of using a screw (or screws) to mount the storage device into a carrier, the second engagement structure provided on the pivotable side panel of the carrier is designed to fit into the receptacle of the storage device to allow for easy engagement and disengagement of the storage device and carrier. In alternative embodiments, the pivotable side panel of the carrier can be provided with the receptacle, with the storage device having an engagement structure to fit into the receptacle of the carrier.

FIG. 1A shows an example carrier 100 for a storage device. The carrier 100 has side panels 104, 106, and 108. In the embodiment of FIG. 1A, the carrier 100 has an open side 110 (a side without a panel). Also, the carrier 100 has a bottom panel 102. The panels 102, 104, 106, and 108 define a chamber in which a storage device can be inserted, such as storage device 200 depicted in FIG. 2.

The open side 110 of the carrier 100 is provided to enable an electrical connector 202 (depicted in dashed profile in FIG. 2) to make an electrical connection with another system. In the FIG. 1A example, the carrier 100 is provided without a top panel. In other implementations, it is noted that the carrier 100 can be modified to include a top panel such that a storage device inside the carrier is enclosed on both the top and bottom sides of the carrier.

Although the carrier 100 depicted in FIG. 1A is generally cuboid shaped (generally shaped as a rectangular parallelepiped), it is noted that carriers in other implementations can have other shapes.

Figure 1B:
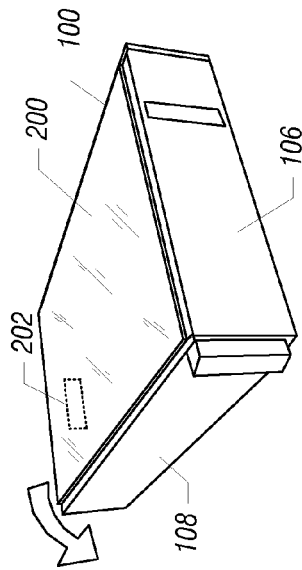
Figure 1C:
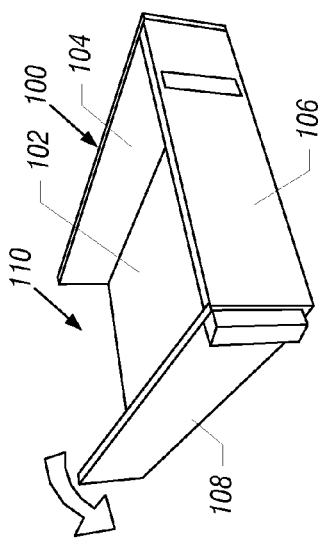

In accordance with some embodiments, the side panel 108 is a pivotable side panel that can pivot between a closed position (depicted in FIG. 1A), and an open position (depicted in FIG. 1C). As shown in FIG. 1C, the pivotable side panel 108 is connected by hinges 112 to the bottom panel 102 of the carrier 100. The hinges 112 can be spring-biased hinges that bias the side panel 108 to the closed position. In other implementations, other pivoting mechanisms to pivotally connect the side panel 108 to the bottom panel 102 can be used. FIG. 1B shows an intermediate position of the side panel 108 between the closed and open positions.

Also depicted in FIG. 1C are engagement posts 114 (which are an example of the second engagement structures discussed above) mounted on the inner wall of the pivotable side panel 108. The engagement posts 114 are used to engage corresponding receptacles (e.g., screw holes) in the storage device. Alternatively, the posts 114 could be provided on the storage device, and the receptacles could be provided on the inner wall of the pivoting side panel 108. Although two engagement posts 114 are depicted in FIG. 1C, it is noted that in alternative implementations, different numbers of posts (one or greater than two) can be used.

A user is able to grab hold of the pivoting side panel 108 and pull the side panel 108 downwardly, as depicted in FIG. 1B. The user can continue the downward pivoting motion of the side panel 108 until the side panel 108 is in its full open position, as depicted in FIG. 1C. Although not depicted in FIG. 1A, a fastening mechanism can be provided to maintain the side panel 108 in its closed position. This fastening mechanism can be a clip that a user can easily unlatch or unlock to allow the side panel 108 to pivot to the open position. Once the side panel 108 has been pivoted to its open position, the storage device 200 (FIG. 2) can be easily removed from the carrier 100, or inserted into the carrier 100.

Although FIGS. 1A-1C depict a carrier with just one pivotable side panel, it is noted that in alternative implementations, additional pivotable side panel(s) can be provided, on the carrier 100.

Figure 3:
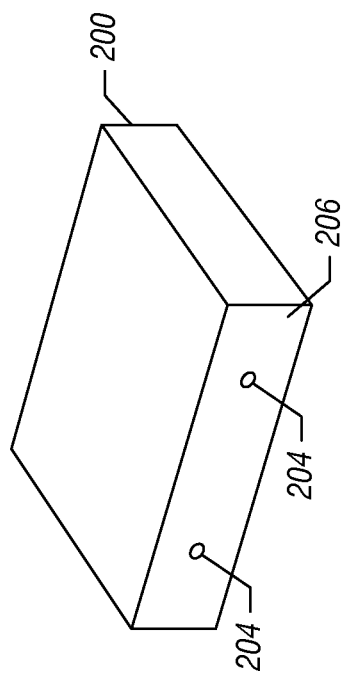
FIG. 3 is a schematic representation of a storage device for mounting in the carrier of FIGS. 1A-1C, according to an embodiment

FIG. 3 shows a storage device 200 outside the carrier. As depicted, one side 206 of the storage device 200 has receptacles 204, such as screw holes, to receive the engagement posts 114 (FIG. 1C) mounted on the pivotable side panel 108.

Figure 2:
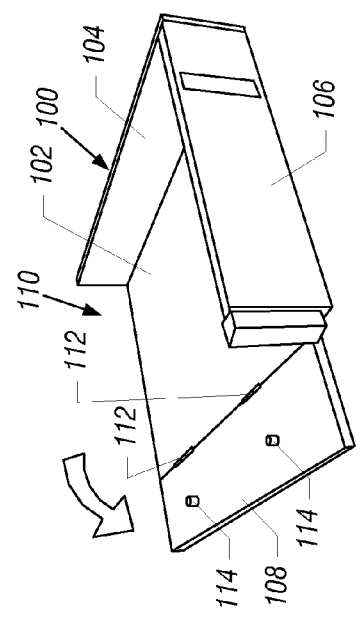
FIG. 2 illustrates a storage device assembly that includes the carrier of FIGS. 1A-1C and a storage device (e.g., disk drive) mounted inside the carrier, in accordance with an embodiment.

FIG. 2 also shows an electrical connector 202 (in dashed profile) provided on a side of the storage device 200 that is different from the side 206 of the storage device 200 that includes the receptacles 204. The electrical connector 202 of the storage device 200 is separate from the receptacles 204 (the first engagement structures of the storage device 200). The electrical connector 202 of the storage device is used to electrically connect the storage device to a system (such as a computer, a storage device rack, and so forth) to enable communication of data and/or commands between the storage device and the system.

Figure 4B:
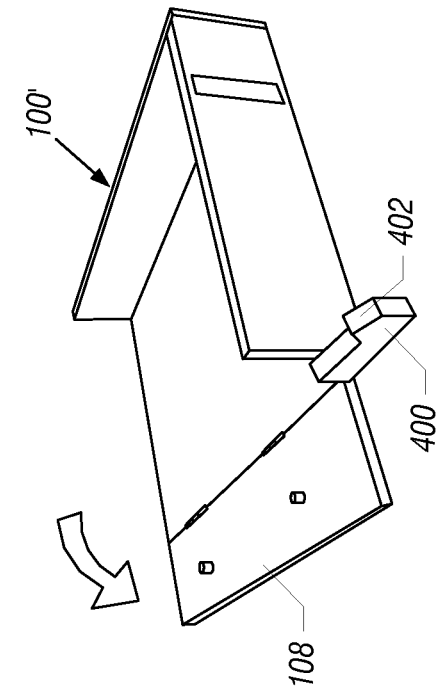
FIGS. 4A and 4B illustrate a storage device carrier according to another embodiment.
Figure 4A:
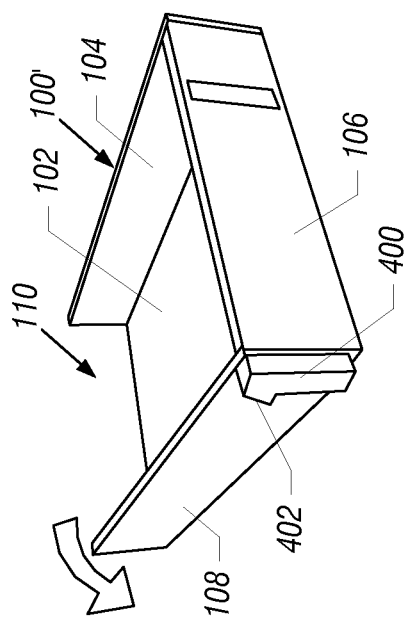

As noted above, a fastening mechanism can be used with the carrier to maintain the pivotable side panel 108 in its closed position. FIGS. 4A-4B illustrate one example of such a fastening mechanism 400. In FIGS. 4A-4B, the fastening mechanism 400 is a locking member that can be pivoted between a locked position (FIG. 4A), and an unlocked position (FIG. 4B). The locking member 400 has a protruding portion 402 that engages the pivotable side panel 108 when the side panel 108 is in its closed position. The engagement of the protrusion 402 with the side panel 108 prevents the side panel 108 from being opened.

If the locking member 400 is pivoted to its unlocked position (FIG. 4B), the pivotable side panel 108 is free to be pivoted to its open position.

Figure 5:
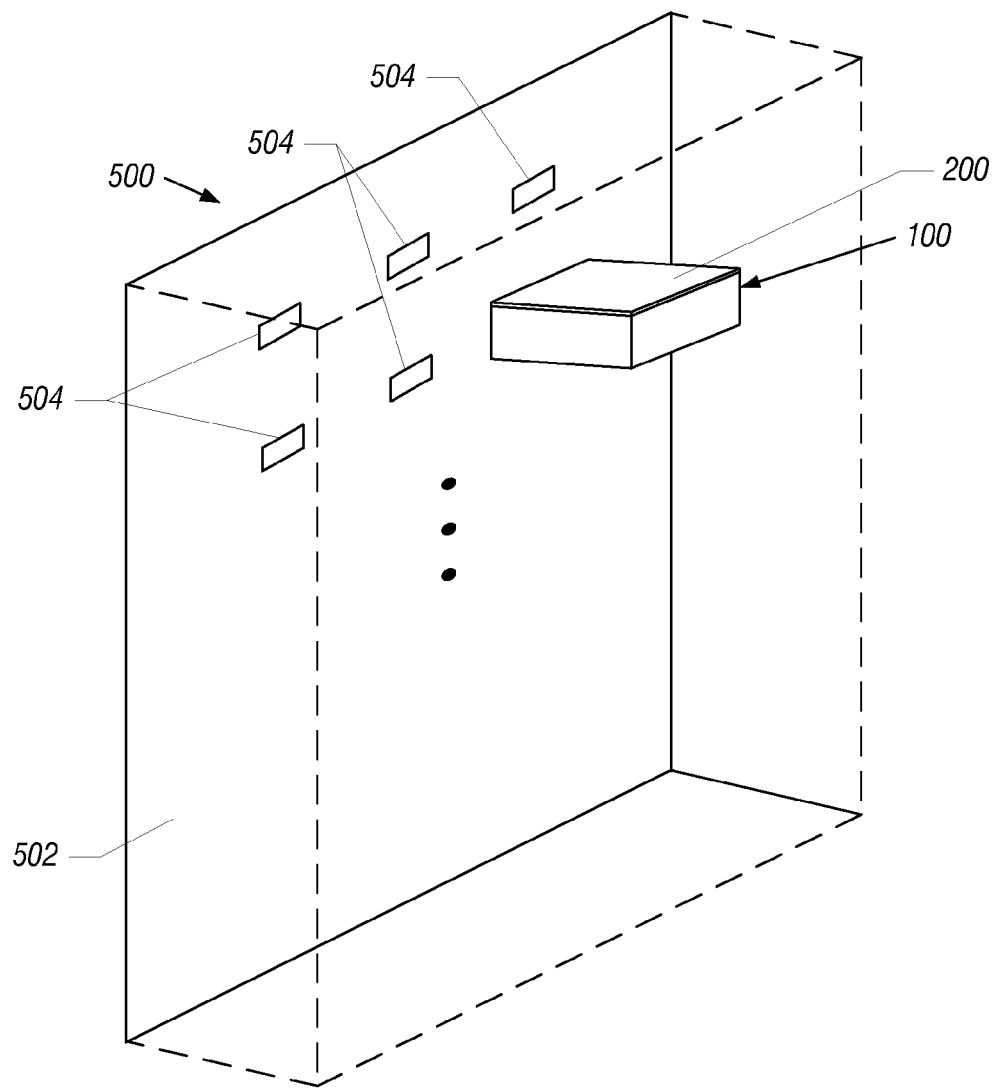
FIG. 5 illustrates a rack in which multiple storage device assemblies can be mounted, where at least some of the storage device assemblies include carriers with pivotable side panels, in accordance with an embodiment.

FIG. 5 is a schematic view of a rack 500 having multiple slots for receiving multiple storage device assemblies, where each storage device assembly includes a carrier 100 and a corresponding storage device 200 mounted in the carrier 100. The rack 500 has partitions and mounting mechanisms (not shown) to enable mounting of the storage device assemblies in the rack 500. The mounting mechanisms of the rack 500 are engaged with mounting mechanisms of corresponding storage device carriers 100 to enable mounting of the storage device assemblies in the rack 500.

The rear panel 502 of the rack 500 has electrical connectors 504 that are used to electrically connect to corresponding connectors 202 of corresponding storage devices (FIG. 2). When a storage device assembly is mounted in a corresponding slot of the rack 500, the electrical connector 202 (FIG. 2) of the storage device 200 electrically connects to a corresponding electrical connector 504 of the rack 500.

In an alternative implementation, a storage device assembly (including the carrier 100 and storage device 200) can be mounted in another type of system, such as a computer system.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. An apparatus comprising:
 a storage device having at least one electrical connector and at least one first engagement structure separate from the at least one electrical connector; and
 a carrier to receive the storage device, wherein the carrier has at least one pivotable panel that is pivotable between a closed position and an open position, the panel having at least one second engagement structure to mechanically engage with the at least one first engagement structure if the panel is in the closed position, and the at least one second engagement structure being released from the at least one first engagement structure if the panel is in the open position, wherein the carrier has a fastening mechanism to lock the pivotable panel in the closed position, and the fastening mechanism includes a locking member pivotable between a locked position and an unlocked position, wherein the locking member is engaged with the pivotable panel when in the locked position, the locking member pivotable in a direction that is perpendicular to a direction of pivoting of the pivotable panel,
 wherein the pivotable panel of the carrier is one of plural side panels of the carrier, and wherein an open side of the carrier is provided without a panel to enable the electrical connector of the storage device to make an electrical connection through the open side with a corresponding connector of a system, and
 wherein the carrier is configured without a top panel so that the carrier has an open top.

2. The apparatus of claim 1, wherein the at least one first engagement structure is configured without any electrical connection element.

3. The apparatus of claim 1, wherein the at least one first engagement structure comprises a receptacle.

4. The apparatus of claim 3, wherein the receptacle comprises a screw hole.

5. The apparatus of claim 3, wherein the at least one second engagement structure comprises a post to be received in the receptacle.

6. The apparatus of claim 1, further comprising a rack, wherein the storage device and carrier form a storage device assembly mounted in the rack.

7. A storage device carrier to receive a storage device, comprising:
- at least one first engagement structure to mechanically engage with a corresponding at least one second engagement structure of the storage device, wherein the at least one first engagement structure is configured without any electrical connection element;
- a pivotable side panel that is pivotable along a first direction between a closed position and an open position, wherein the at least one first engagement structure is configured to be lockingly engaged with the at least one second engagement structure of the storage device when the side panel is in the closed position, and wherein the at least one first engagement structure is configured to be released from the at least one second engagement structure when the side panel is in the open position;
- a fastening mechanism including a locking member pivotable along a second direction, perpendicular to the first direction, between a locked position and an unlocked position, wherein the locking member is engaged with the side panel when in the locked position; and
- additional side panels and a bottom panel to define a chamber in the carrier to receive the storage device, wherein an open side of the storage device carrier is provided without a side panel to enable an electrical connector of the storage device to make electrical connection through the open side with a connector of a system,
- wherein the carrier is configured without a top panel so that the carrier has an open top.

8. The storage device carrier of claim 7, wherein the at least one first engagement structure comprises a post to be received by a receptacle of the storage device.

9. A method of removably mounting a storage device in a carrier, comprising:
- pivoting a pivotable side panel of the carrier along a first direction between an open position and a closed position, wherein the pivotable side panel is one of plural side panels of the carrier;
- receiving the storage device in the carrier, wherein an open side of the carrier is provided without a panel to enable an electrical connector of the storage device to make an electrical connection through the open side with a corresponding connector of a system, and wherein the carrier is configured without a top panel so that the carrier has an open top;
- lockingly engaging a first engagement structure of the carrier with a second engagement structure of the storage device when the pivotable side panel is in the closed position, wherein the first and second engagement structures are provided without any electrical connection element; and
- pivoting a locking member along a second direction, perpendicular to the first direction, between a locked position and an unlocked position, wherein the locking member is engaged with the pivotable side panel when in the locked position, and the locking member is disengaged from the pivotable side panel when in the unlocked position.

10. The method of claim 7, further comprising mounting a storage device assembly including the storage device and the carrier in a rack that has other storage device assemblies.

11. The method of claim 10, wherein mounting the storage device assembly in the rack causes an electrical connector of the storage device that is separate from the second engagement structure of the storage device to electrically connect to a corresponding electrical connector of the rack.

* * * * *

UNITED STATES PATENT AND TRADEMARK OFFICE
CERTIFICATE OF CORRECTION

| | | |
|---|---|---|
| PATENT NO. | : 8,531,828 B2 | Page 1 of 1 |
| APPLICATION NO. | : 12/996384 | |
| DATED | : September 10, 2013 | |
| INVENTOR(S) | : Trentent Tye et al. | |

It is certified that error appears in the above-identified patent and that said Letters Patent is hereby corrected as shown below:

In the Claims

In column 6, line 25, in Claim 10, delete "claim 7," and insert -- claim 9, --, therefor.

Signed and Sealed this
Twenty-second Day of April, 2014

Michelle K. Lee
*Deputy Director of the United States Patent and Trademark Office*